July 24, 1934. J. F. QUEREAU 1,967,428
FLUID SAMPLING SYSTEM
Filed Sept. 30, 1931   2 Sheets-Sheet 1

INVENTOR.
John F. Quereau
BY
his ATTORNEY.

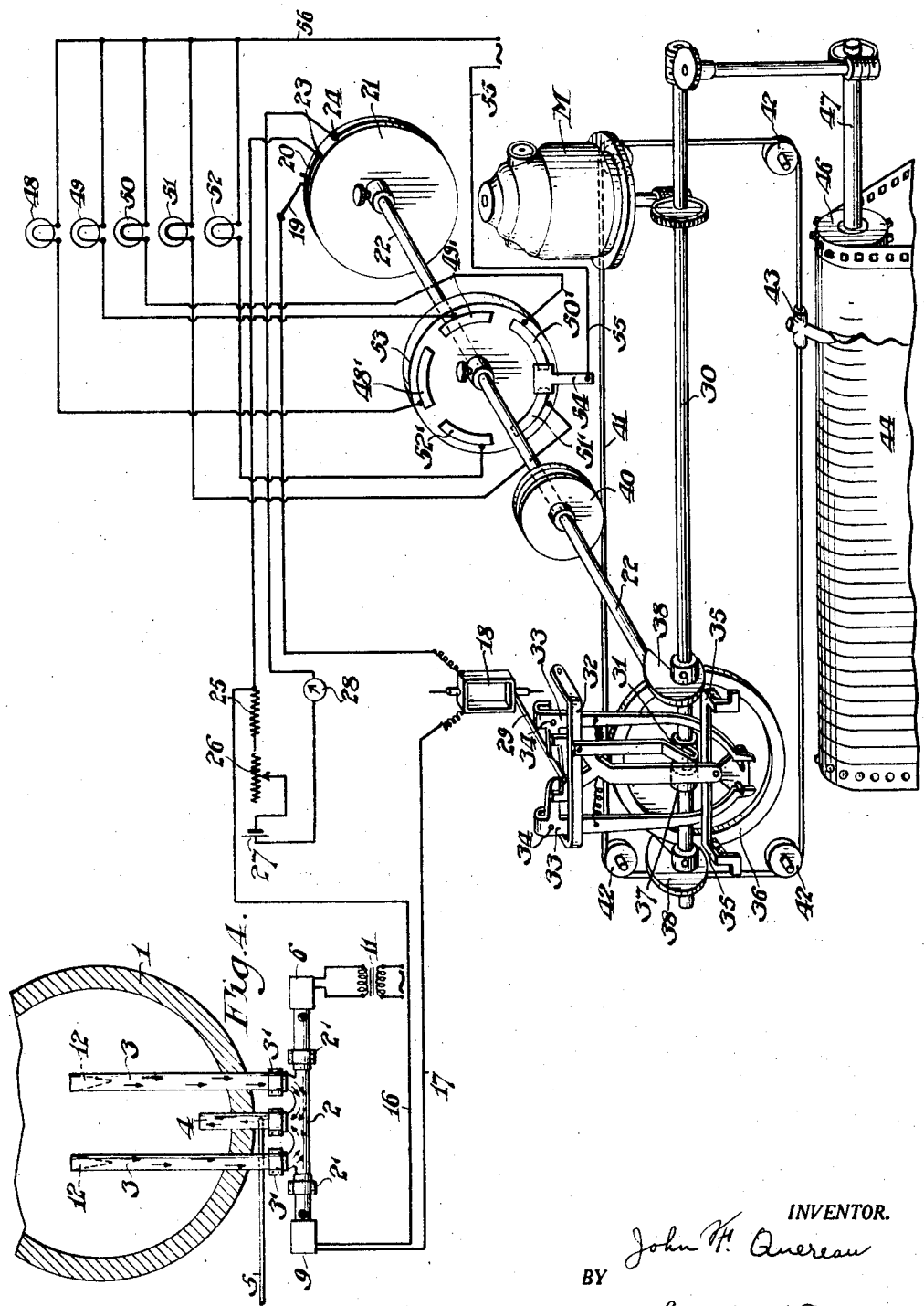

Patented July 24, 1934

1,967,428

UNITED STATES PATENT OFFICE

1,967,428

FLUID SAMPLING SYSTEM

John F. Quereau, Philadelphia, Pa., assignor to Leeds & Northrup Company, Philadelphia, Pa., a corporation of Pennsylvania Application September 30, 1931, Serial No. 565,935

7 Claims. (Cl. 88—14)

My invention relates to fluid sampling systems, and particularly to systems for determining the relative number of particles in suspension in a gas, for example, smoke, fumes, etc., by measuring the opacity of the gas.

In accordance with my invention, a sample of the gas or other fluid, whose opacity is to be measured, is taken in such manner that the same is representative of the main body of the fluid, more particularly, samples from different zones of the main body of the fluid are taken and the opacity of the combined samples determined; specifically, samples from different points in the central portion of a fluid stream are continuously withdrawn by tubes and passed through a common chamber in which the opacity of the withdrawn fluid is measured.

Further in accordance with my invention, all particles in the fluid withdrawn are caused to remain in suspension, and thus prevent particles from settling out as the fluid is passed through the sampling structure; specifically, the velocity of the flow through the sampling tubes and measuring chamber is maintained sufficiently high that substantially none of the particles settle out.

Further in accordance with my invention, the gas or other fluid in the sampling structure is maintained at substantially the same pressure as the main body of fluid from which it was drawn, so that the sample measured will have the same opacity per unit volume as that of the main body; specifically, the flow through the sampling structure is created by negative pressure, that is, the absolute pressure in the measuring chamber is maintained very slightly less than the absolute pressure in the zone from which the sample is drawn, the difference in pressures being negligible for all practical purposes.

Still further in accordance with my invention, the flow of the sample through the measuring chamber is in a direction away from the measuring apparatus so that the fluid will not tend to cloud or obscure the measuring apparatus; specifically, the fluid samples are introduced at points intermediate the ends of a manifold, or equivalent chamber, positioned between the measuring apparatus, and the fluid is withdrawn through an outlet intermediate the inlet points so that the flow of fluid in the manifold is away from its ends. Preferably, a small amount of air is caused to enter the ends of the manifold and pass to the outlet, the air carrying with it any fluid which may have gotten into the ends of the manifold adjacent the measuring apparatus.

My invention further resides in the features of combination, construction and arrangement hereinafter described and claimed.

For an understanding of my invention, and some of the various forms it may take, reference is had to the accompanying drawings, in which:

Fig. 4 shows a smoke density indicating and recording system embodying the principles of the invention.

In a sampling system to be used in connection with gas opacity measuring apparatus, and particularly in such systems for indicating the number of particles in a gas, the requirements are (1) that the sample be representative of the main body of gas, (2) that all particles remain in suspension in the gas as it passes through the sampling system, and (3) that the gas in the measuring chamber be at the same pressure as the gas in the zone from which the sample is drawn, or that its pressure have a constant ratio to the pressure of the zone from which the sample is drawn.

The necessity for the first two conditions is obvious. The third condition is necessary because the opacity of a gas carrying particles in suspension, for a given size and color of particles, is dependent on the number of particles per unit volume of the gas, and hence on the pressure of the gas. A given number of particles in suspension in a given volume of gas will have a certain opacity, but if the pressure of the gas changes, decreases, for example, the volume will increase while the number of particles in suspension remains constant. The result will be a decrease in the number of particles per unit volume, and hence a decrease in opacity. It is therefore evident that the pressure in the sampling apparatus must be the same as the pressure in the space from which the sample is drawn if the sample is to have the same opacity as the main body of gas.

Figure 1:
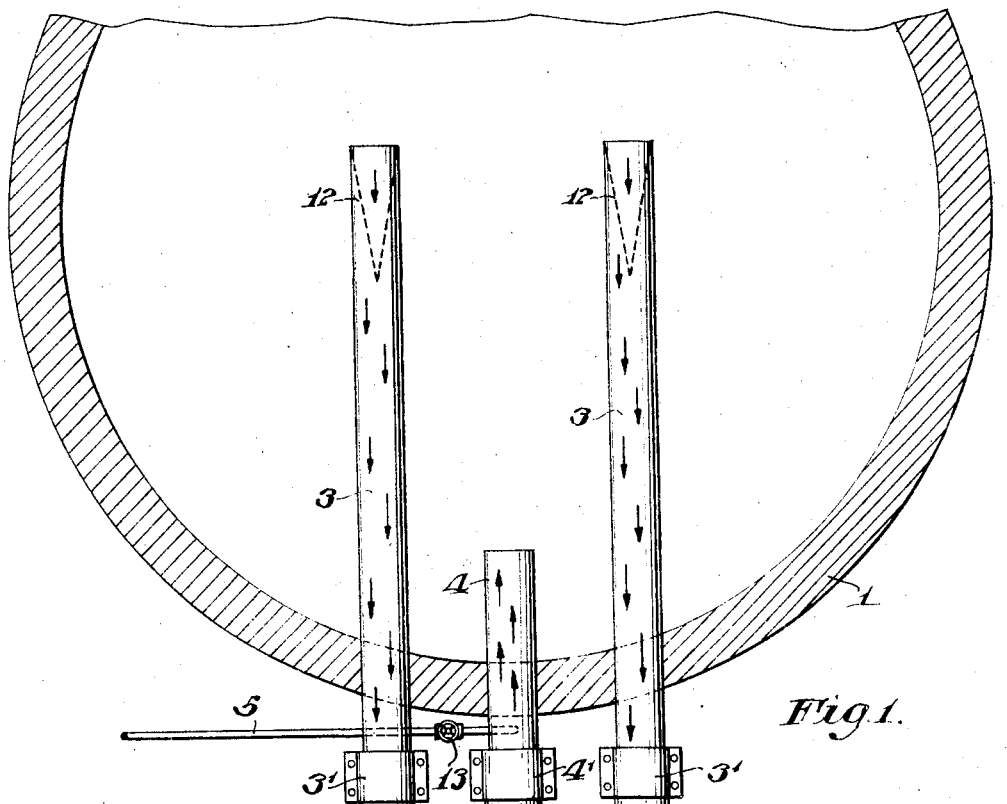
Fig. 1 is a plan view of the sampling tubes and measuring chamber mounted in position in a stack wall.

Referring now particularly to Fig. 1, there is shown a plan view of the sampling apparatus inserted through the side wall 1 of a flue or stack in which it is desired to determine the smoke density. The apparatus comprises a measuring chamber or manifold 2 positioned outside the stack, having two intake conduits or tubes 3, 3, and an outlet or discharge tube 4, extending from the side of the chamber, and passing through the stack wall. The manifold may be in the form of a casting and the tubes detachably connected thereto by couplings 3', 4', and the measuring chamber may comprise sections connected by couplings 2'. By means of an aspirator, comprising air, steam or other fluid flowing under pressure from the pipe line 5 into the outlet tube 4, samples of the smoke are drawn in through the two intake tubes and, after passing through the measuring chamber 2, are returned to the stack by tube 4, the direction of flow of the samples being indicated by the arrows. It will be understood that any suitable means, other than the aspirator arrangement shown, for example, a fan or draft, may be used to impel a flow of the smoke at the proper rate through the sampling apparatus.

Figure 2:
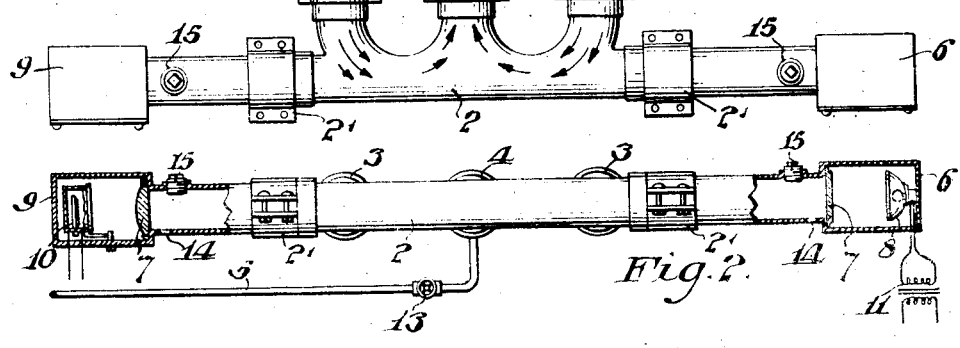
Fig. 2 is a front view in elevation, with parts in section, of the sampling tubes and measuring chamber of Fig. 1.

In the compartment 6 connected to the right hand end of the chamber 2, and preferably, although not necessarily, separated therefrom by a transparent plate or lens 7, as shown in Fig. 2, is a source of radiant energy 8, for example, an electric light, while in the compartment 9 at the left hand end of chamber 2, and preferably separated therefrom by a lens 7, or equivalent, is a thermopile 10, or equivalent thermoresponsive element, or a light sensitive device, as a photo-electric cell, which receives the energy passing through chamber 2 from the source 8, and which either generates a voltage, or varies the resistance of an electric circuit connected thereto, in accordance with the amount of energy received by the element or cell. The measuring chamber and compartments are entirely enclosed, and since there is a constant energy source in the lamp 8, the amount of energy falling on the thermopile is inversely proportional to the density of the smoke passing through chamber 2, and thus the voltage generated by the thermopile may be used to actuate structure to indicate the density of the smoke flowing through the stack. The lamp 8 is shown as energized from a source 11 of alternating current, although direct current may also be used, if desired. The thermopile 10 is connected to indicating and recording apparatus, as hereinafter explained.

Figure 3:
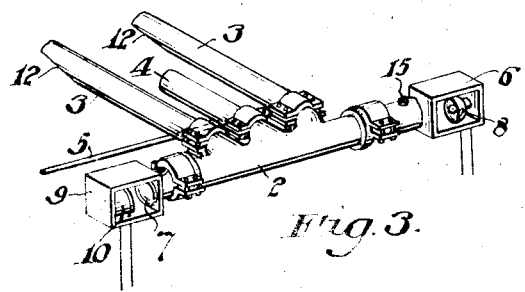
Fig. 3 is a perspective view of the sampling tubes and chamber removed from the stack.

The open ends of the intake tubes preferably extend to approximately the center of the stack, and have large V-shaped openings at their ends formed by diagonal cutaway portions indicated in dotted outline at 12. The openings are underneath, as the tubes are viewed in Figs. 1 and 3, and face in the direction of flow of the smoke to facilitate intake. The ends of the tubes are relatively widely separated so that the samples are drawn from two different zones in the central portion of the smoke stream, and from a considerable area in the smoke stream due to the long V-shaped openings at their ends, and the smoke in the measuring chamber is therefore more nearly representative of the smoke in the stack.

The velocity of the smoke in the tubes and the measuring chamber may be varied, as by a valve 13 in the pipe line comprising the aspirator, and may be made sufficiently high so that none of the particles in the smoke settle out in the tubes or chamber, and thus all particles remain in suspension as the smoke passes through the sampling system. The velocity of flow does not affect the opacity of the smoke in the measuring chamber, since the opacity, for a given size and color of particles, is dependent upon the number of particles per unit volume of the smoke, and not on the total number of particles passing through the sampling system.

The pressure of the smoke in the sampling system, for all practical purposes, is the same as the pressure in the smoke stream from which the samples are drawn. The flow through the sampling system is created by a negative pressure at the fan or aspirator, of the order of a fraction of an inch of water, that is, the absolute pressure in the measuring chamber is but a fraction of an inch less than the absolute pressure in the zones of the smoke stream from which the samples are drawn, and this difference in pressure is negligible in all systems in which the main body of gas is not at a high vacuum, for example, of the order of 26" of mercury. If the gas is at a pressure comparable with atmospheric pressure, as in the case of a smoke stream, the pressure in the sampling system may be substantially the same as the pressure in the main gas stream, and yet afford the necessary velocity of flow to prevent settling out in the sampling system.

In order to obtain uniform measurement of the opacity, it is essential that the surfaces of the transparent plates or lenses 7 remain clean at all times; that is, that the smoke be prevented from coming in contact with them, and the apparatus is designed to accomplish this. By introducing the smoke at separated points in the manifold 2 and withdrawing it at an intermediate point, as at the center, there is obtained a direction of flow in the manifold which is away from the lenses at both ends, and this greatly reduces the tendency of the smoke to enter the ends of the manifold where it can dirty the lenses. Also, the intake tubes 3, 3 and the outlet tube 4 are curved or streamlined in the fluid path to give smooth conditions of flow at their junction with the manifold, and the wall of the manifold is correspondingly curved, thus preventing turbulence and formation of eddy currents which might introduce smoke into the ends of the manifold. Thus, due to the direction of flow of the smoke in the manifold and to the smooth conditions of flow, there is little tendency for the gas to enter the ends and come into contact with the lenses.

As a further precaution to prevent smoking of the lenses, a small amount of air may be allowed to enter or be introduced into the manifold at each end through small openings 14, shown in Fig. 2, and in flowing to the outlet 4 the air carries with it any small amount of smoke which may have gotten into the ends of the manifold. The amount of air thus introduced is so small compared to the volume of smoke handled that the dilution of the sample by it is negligible. Inspection plugs 15, which are considerably larger in diameter than the openings 14, are screw-threaded into openings in the manifold, and may be removed for inspection and checking purposes, as hereinafter explained.

If measuring apparatus, such as a thermopile or photo-electric cell is used for measuring the opacity of the smoke, the foregoing sampling apparatus has an important advantage over an arrangement in which the light is sighted through a tube placed directly across the main smoke stream, the tube having a section cut away at the center through which the gas passes. In the latter case, the distance from the lamp to the light sensitive cell is dependent on the size of the flue or stack in which the smoke is flowing, and is therefore variable, and this is a factor which is difficult to compensate for in the manufacture and installation of the apparatus. Also, in certain installations, such as in a large smoke stack, the single pipe may be so long as to be difficult to install due to lack of space. With the sampling apparatus herein described, however, the distance from the lamp to the receiver is fixed, and is independent of the diameter of the flue or stack from which the sample is drawn, and the apparatus may be calibrated at the factory. As shown most clearly in Fig. 3, the sampling system and measuring apparatus may comprise a unitary structure, and as the length of the sampling tubes is but one-half or less than the diameter of the flue or stack, and as the tubes are inserted through one side only of the stack, considerably less difficulty is involved in installing the apparatus.

If the opacity measuring apparatus is calibrated, the sampling system of the invention has a distinct advantage over systems involving a direct measurement across a gas stream, since it allows a ready means of obtaining a zero check on the apparatus. By shutting off the gas inlets, as by valves, not shown, and allowing clear air to enter the manifold, the condition of zero opacity is obtained and thus a zero check may be readily made. If the main gas stream is at a negative pressure, as in the case of a smoke stack, it is only necessary to shut off the aspirator and remove the inspection plugs 15, the air entering through the inspection holes being sufficient to clear the manifold and allow a zero check of the apparatus to be made.

Fig. 4 shows a smoke indicating and recording system in which the thermopile 10 is connected by means of conductors 16 and 17 to the movable coil 18 of a galvanometer, or equivalent current detecing instrument, and, preferably, to a potentiometer circuit comprising a sliding contact arm 19 which bears upon a slide-wire resistance 20 mounted on the periphery of an insulating drum 21, the drum being rotatably mounted on a shaft 22, and operated as hereinafter explained. Included in the potentiometer circcuit and connected across the terminals 23 and 24 of the slide wire is a fixed resistance 25, variable resistance 26, and a battery cell 27, which supplied constant current to the potentiometer circuit. A milliammeter 28 or equivalent instrument may be connected in the potentiometer circuit to detect or measure the current flowing therein.

The battery cell 27 is connected in opposition to the thermopile, and therefore when the resistance of the potentiometer circuit, including the effective resistance of the slide wire, has such value that the potential across the potentiometer circuit is equal to the potential produced in the thermopile circuit, the voltages in the circuits are equal and opposite, and there will be no current flow through the galvanometer coil 18.

The values of the resistance 26 and variable resistance 25 are made such that for a given position of the contact arm 19 along the slide wire 20, when a predetermined value of opacity obtains in the measuring chamber 2, the potential or voltage generated by the thermopile will just equal the voltage of the potentiometer circuit, under which condition no current will flow through the galvanometer coil 18.

When the density of the smoke passing through the manifold increases or decreases, the opacity varies accordingly, and therefore the potential generated by the thermopile will be correspondingly larger or smaller, and in either case an unbalanced condition between the thermopile and the potentiometer cicrcuits obtains, and current flows through the coil 18; when the opacity increases, the current will flow in a given direction through coil 18, and when the opacity decreases, the current will flow in the opposite direction, so that the direction of rotation of the coil 18 may be in either direction.

In the example herein illustrated, the galvanometer coil 18 controls mechanical relay apparatus, and cooperates with the potentiometer circuit as in prior Letters Patent to Leeds 1,322,182, and reference may be had thereto for a detailed description of the operation of the relay mechanism and potentiometer circuit. It will be understood, however, that the coil 18, or equivalent, may be used in association with any other suitable arrangement adapted to the apparatus herein described, or to any equivalent control apparatus or system.

Briefly, the operation of the mechanical relay and the potentiometer circuit is as follows:

The measuring circuit illustrated involves making null measurements, and this requires a continuous adjustment of the voltage in the potentiometer circuit in order to keep such voltage at all times equal to the voltage set up in the thermopile. The arrangement requires, among other things, a considerable amount of power for moving the slide wire contact arm, and it is out of the question to attempt to get sufficient power from the feeble currents set up in the ordinary circuit by a thermopile. Hence, a relay mechanism is utilized in which the feeble current from the thermopile is required to do practically no work, the work all being done by an auxiliary source of power.

As shown in the drawings, an auxiliary source of power, as the electric motor M, rotates the shaft 30 at substantially constant speed, which shaft carries various cams for controlling the operation of the relay structure. Alternately, at intervals of a second or two, the galvanometer pointer 29 is allowed to swing freely, and is then engaged by the relay mechanism. When the galvanometer pointer is free, it assumes a position dependent upon the direction and extent of the unbalance in the potentiometer circuit due to the voltage generated by the thermopile 10. In the remaining interval of the cycle, the arrangement is such that the motor M adjusts the potentiometer setting in the direction and by an amount corresponding to the galvanometer deflection, so that the amount of adjustment is about proportional to the need for adjustment.

Immediately following the brief interval in which the galvanometer is allowed to deflect, a cam 31 on the shaft 30 raises the lifting bar 32 and pushes the galvanometer pointer up against one or the other of the two bell crank levers 33 which are pivoted at 34. It will be seen that, for small deflections, the lifting of the bell crank lever is done at a point far from the pivot point, and for maximum deflection of the galvanometer the lifting is done at a point near to the pivot point. Consequently, the greater the galvanometer deflection, the greater the deflection of the bell crank lever. The deflection of these bell crank levers is transmitted to a clutch bar 35 so that this clutch bar is deflected an amount corresponding to the galvanometer deflection and in a direction corresponding to the galvanometer deflection.

During this part of the cycle, the clutch bar 35 is disengaged from the clutch wheel 36 by means of a clutch cam 37, so that the tilting of the clutch bar by the bell crank lever involves only a small amount of power and produces only a small shearing stress on the galvanometer pointer. The clutch cam 37 promptly moves out of the way, allowing the clutch bar 35 to engage with the clutch wheel, so that in order to restore the clutch bar to its normal or horizontal position, the clutch wheel 36, which is connected through shaft 22 to the potentiometer slide wire disk 21, must be carried with it for a distance corresponding to the deflection of the clutch bar, and, hence, corresponding to the deflection of the galvanometer and to the unbalance in the potentiometer circuit.

The clutch bar 35 is returned to its horizontal position once each cycle by large cams 38, 38, driven by the shaft 30, there being one cam for each direction of deflection. The cycle is repeated continuously, with the result that the galvanometer is maintained in its null or zero position. The position of the slide wire disk 21 accurately represents the voltage generated in the thermopile, and therefore is a means of determining the smoke density in the measuring chamber.

A graphic record of the voltage generated by the thermopile may be obtained by the use of the recorder shown, which comprises a grooved pulley or drum 40 mounted on the shaft 22, and which causes the belt 41, passing around pulleys 42, to move the marker or recorder pen 43 with respect to the recorder paper 44. The paper is stored upon a roll, not shown, and has marginal perforations engaging the teeth or pins of the roller 46 secured upon the shaft 47, which is driven by the shaft 30 through the worm end gear drive shown. The recorder reads directly in percent smoke density or Ringelmann chart numbers.

A boiler-room indicator is also provided by utilizing a visual indicator, as a bank of lamps 48 to 52 which are so connected as to indicate the smoke condition in the stack. The lamps may comprise different colors, representative of different colors of the smoke or different degrees of density, and a number of such banks electrically connected in parallel may be located in various places in the boiler-room, so that the condition of the stack may be observed at all times from any point in the boiler-room. The lamps 48 to 52 have one side connected to and controlled by corresponding contacts or segments 48' to 52' carried by an insulating disk 53 which is mounted on shaft 22, the position of the disk 53 corresponding to that of potentiometer disk 21. The other side of each lamp is connected to one side 56 of a source of power supply. The sliding contact arm 54 is connected by conductor 55 to the other side of the power supply line, the arm making contact with the various segments 48' to 52' as the disk 54 is rotated by shaft 22, so that at all times at least one of the lights 48 to 52 is burning, and the color of the lamp burning instantly tells the fireman the smoke condition in the stack. Other indicating means, for example, targets, blinkers, etc., may obviously be used in the place of lamps, if desired, to indicate the condition in the stack in the manner described.

The term "light" in the appended claims is used in a generic sense to comprehend radiant energy of wavelengths lying outside of the spectrum visible to the human eye.

What I claim is:

1. Apparatus for determining the average opacity of fluid traversing a pipe, stack or the like, comprising a tubular chamber, a light source at one end thereof, an electrical light-responsive device at the opposite end thereof, calibrated electrical apparatus controlled by said device, inlet tubes inserted in said stack to tap from regions spaced transversely of the fluid stream and extending to inlets spaced longitudinally of said chamber, and an outlet tube extending from said chamber intermediate said inlets into said stack, the side streams withdrawn by said inlet tubes flowing away from both ends of said chamber toward said outlet tube and longitudinally of the path of light from said source to said device.

2. Apparatus for determining the average opacity of fluid traversing a pipe, stack or the like, comprising tubes inserted therein to tap from regions spaced transversely of the fluid stream, a tubular chamber connecting the external ends of said tubes and discharging intermediate said tubes whereby the side streams of liquid withdrawn by said tubes flow away from both ends of the chamber, an electrical light responsive device at one end of said chamber beyond one of said tubes, calibrated electrical apparatus controlled by said device, and a source of light at the opposite end of said chamber beyond the other of said tubes for directing light through said side streams in succession onto said device.

3. Apparatus for determining the average opacity of fluid traversing a pipe, stack or the like, comprising two inlet tubes having open ends within the stack space transversely of the fluid stream therein and extending exteriorly thereof from the same side of the stack, an outlet tube, a tubular chamber connecting the external ends of the tubes and traversed axially by fluid from the stack, an electric light-responsive device at one end of said chamber beyond one of said tubes, calibrated electrical apparatus controlled by said device, and a source of light at the opposite end of said chamber beyond the other of said tubes for directing light longitudinally of the flow of fluid within said chamber onto said device.

4. Fluid sampling apparatus comprising a measuring chamber, a source of light at one end of said chamber, an electrical light-responsive device at the opposite end of said chamber, calibrated electrical apparatus controlled by said device, and means for effecting flow of two streams of a fluid sample within said chamber longitudinally of the path of light from said source to said device, to a point of common discharge, from points on opposite sides thereof more adjacent said light source and said device respectively.

5. Apparatus for measuring the average opacity of gas traversing a pipe, stack, or the like, comprising a tubular chamber, a light source at one end thereof, an electrical light-sensitive device at the opposite end thereof, calibrated electrical apparatus controlled by said device, inlet tubes inserted at the same side of said stack disposed to tap from regions spaced transversely of the gas stream and extending to inlets of said chamber spaced longitudinally of the path of light from said source to said device, an outlet tube extending from said chamber intermediate said inlets whereby the side streams withdrawn by the inlet tubes flow away from both ends of the chamber, and means for introducing air at both ends of the chamber beyond said inlets and in front of said source and said device.

6. Apparatus for determining the average opacity of fluid traversing a pipe, stack or the like, comprising a tubular chamber, a light source at one end thereof, an electrical light responsive device at the opposite end thereof, calibrated electrical apparatus controlled by said device, inlet tubes inserted in said stack to tap from regions spaced transversely of the fluid stream and extending to inlets spaced longitudinally of said chamber, an outlet tube extending from said chamber intermediate said inlets into said stack, said inlet and outlet tubes opening at regions in said stack between which there exists insubstantial difference of pressure, and means in the outlet tube for drawing gas through said inlet tubes into said chamber, thence longitudinally of said chamber and of the path of light from said source to said device, and thence back to the stack.

7. Apparatus for determining the average opacity of fluid traversing a pipe, stack or the like, comprising a tubular chamber having transparent ends, a light source at one end thereof, an electrical light-responsive device at the opposite end thereof, calibrated electrical apparatus controlled by said device, inlet tubes inserted in said stack to tap from regions spaced transversely of the fluid stream and extending to inlets spaced longitudinally of said chamber, an outlet tube extending from said chamber intermediate said inlets into said stack, the side streams withdrawn by said inlet tubes flowing away from both ends of said chamber toward said outlet tube and longitudinally of the path of light from said source to said device, said tubes at the junction with said chamber having surfaces curved in the direction of flow to prevent turbulence and eddy currents to minimize settling of particles in the fluid upon the transparent ends of the chamber which would introduce error, and means for admitting air to both ends of the chamber beyond said inlet tubes to assist in precluding clouding of the transparent ends of the chamber by settled out particles.

JOHN F. QUEREAU.